April 22, 1958  J. G. LEONARD  2,831,671
EMERGENCY SPEED GOVERNOR
Filed Dec. 20, 1955
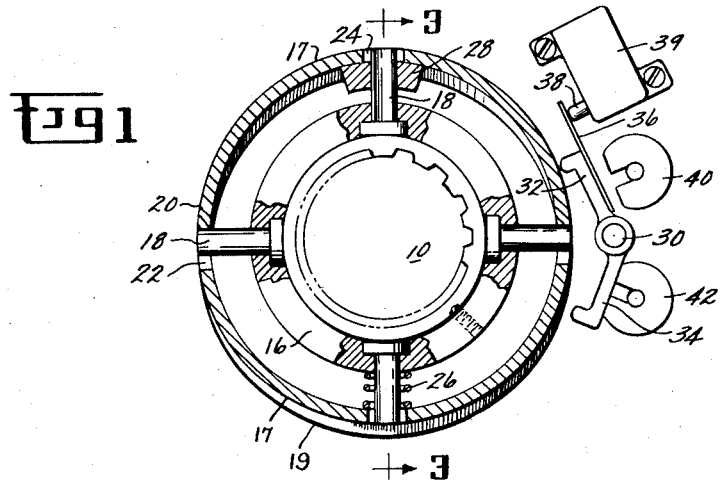
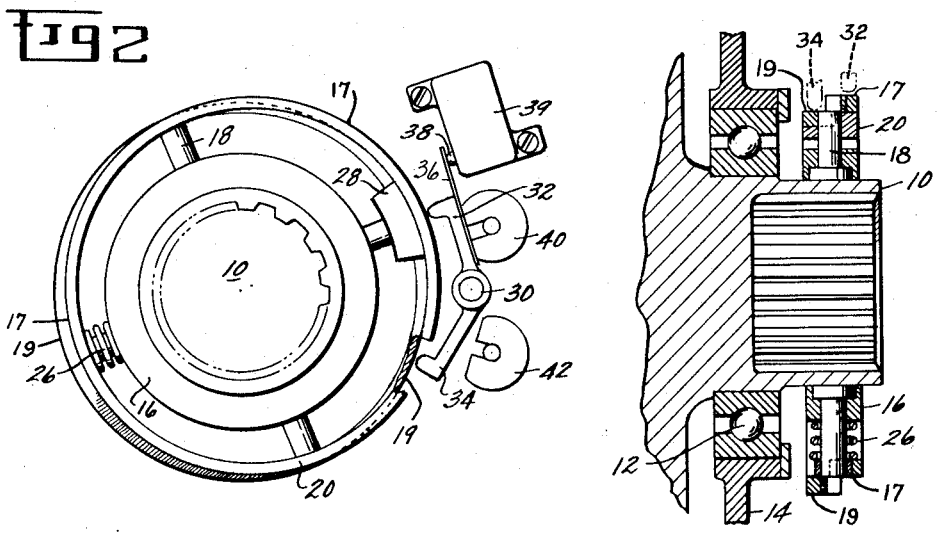
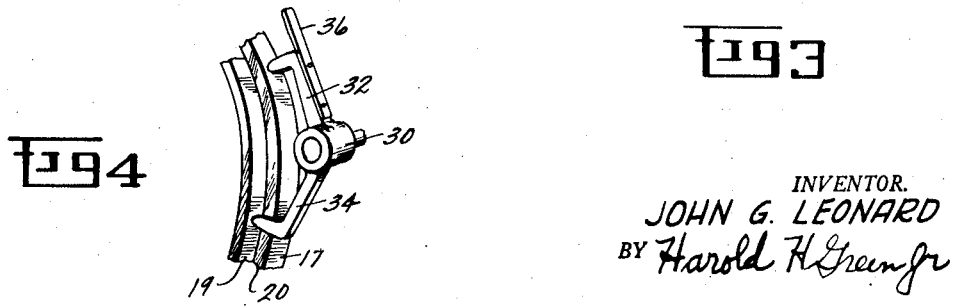
INVENTOR.
JOHN G. LEONARD
BY Harold H. Green Jr
HIS ATTORNEY

United States Patent Office 2,831,671
Patented Apr. 22, 1958

2,831,671

EMERGENCY SPEED GOVERNOR

John Gates Leonard, Lynn, Mass., assignor to General Electric Company, a corporation of New York Application December 20, 1955, Serial No. 554,204

6 Claims. (Cl. 264—17)

This invention relates to emergency speed governors and particularly to an emergency speed governing device adaptable for use with high speed turbomachinery. One common form of emergency governor which has been used with steam turbines is that in which a bolt or plunger is located in a rotating shaft and is held against movement normally by a spring, but in the case of excess speed is thrown out by centrifugal force to strike a trip finger or trigger which when moved releases an emergency regulating apparatus. One of the disadvantages of this type of arrangement is that the bolt or plunger continues to strike the trip finger as long as the overspeed condition exists or if means are employed to avoid this by holding the trip finger free of the bolt once it is tripped, the device then is not automatically resetting. In connection with airborne accessory turbine equipment, it is usually important that the emergency governor be automatically resetting. Many conditions which may cause such a unit to overspeed, such as a quick drop in load, may be subsequently corrected thus making it feasible to restart the unit in flight once it has been shut down by the emergency governor. Since this equipment is usually remotely located from the aircraft cabin and the operator, it is not feasible to rely on a manual reset of the governor to restart the unit. Thus it is desirable to make the emergency governor itself automatically resetting and provide additional control equipment in the aircraft cabin which will enable the operator to restart the unit at the press of a button. Since the rotational speed of this type of machinery is usually extremely high, it is also important that an arrangement be used in which the contact between the actuating device and a control lever is minimized in order to reduce vibration and wear of the parts. Accordingly, it is an object of the present invention to provide an improved emergency governor for high speed turbomachinery which is automatically resettable and provides a minimum of contact between the parts.

Briefly, this and other objects of the invention are accomplished by providing a weighted trip ring of two nonconcentric annular sections, one operating on overspeed to trip a rocker arm, the other section operating to return the rocker arm to the original position upon the device reaching a safe speed again.

The invention will be better understood from the following description taken in connection with the accompanying drawing in which:

Figure 1 is an end view partly in section of an overspeed governing arrangement in accordance with the present invention;

Figure 2 is an end elevation view of the apparatus shown in Figure 1 showing the apparatus in the tripped or overspeed condition;

Figure 3 is a sectional view of the aparatus shown in Figure 1 taken along the lines 3—3 of Figure 1; and Figure 4 is an enlarged perspective view of the rocker arm and trip ring assembly in accordance with the present invention.

In the drawing, a rotatable shaft 10 is mounted for rotation in suitable bearing means shown in the drawing as a ball bearing 12 which is mounted in a suitable bearing support member 14. Fitted over the shaft 10 for rotation therewith is an inner ring 16 which carries four radially outwardly extending support posts 18. The support posts 18 serve to support a trip ring 20. The trip ring 20 is a unitary structure comprising two anular sections 17 and 19 displaced slightly from one another so as to not be concentric. The trip ring 20 is provided with two pairs of openings 22 and 24 to receive the ring support posts 18. The openings 24 are slightly larger than the cross-section of the ring support posts 18 to allow radial motion therebetween without appreciable tangential motion. The other pair of openings 22 are larger to provide a limited amount of motion of the trip ring in a direction normal to the support posts 18 passing through them. At one limit of motion of the trip ring 20, the portion 17 is concentric with the inner ring 16 as shown in Figure 1 and at the other limit the portion 19 is concentric with the inner ring 16 as shown in Figure 2. A helical spring 26 is placed to surround one of the support posts 18 and is located between the inner and outer rings 16 and 20 in order to bias the outer ring outward, with respect to the inner ring toward the position shown in Figure 1. A weight 28 is fixed to the trip ring 20 at a point diametrically opposite the helical spring 26 to create a centrifugal force to oppose the bias of the spring 26 upon rotation of the ring 20. When the device is at rest, the spring 26 biases the parts to the relative position shown in Figure 1 so that the portion 17 of the trip ring 20 is concentric with the inner ring 16 and shaft 10. Upon the rotational speed of the shaft 10 exceeding a predetermined value determined by the size of the weight 28 and spring constant of the spring 26, centrifugal force acting on the ring 20 will cause it to move against the bias of the spring 26 to assume the position indicated in Figure 2.

A rocker arm assembly 30 is pivotally mounted on a support member (not shown) adjacent the circumference of the trip ring 20. The rocker arm assembly 30 comprises two separate arms 32 and 34. The arm 32 is positioned adjacent the portion 17 of the trip ring 20 and the arm 34 is positioned adjacent the portion 19 of the trip ring 20 as can be best seen in Figure 4. The rocker arm 32 has an extension 36 attached thereto to actuate a contact button 38 of an electrical switch 39. A pair of permanent holding magnets 40 and 42 are mounted adjacent the rocker arms 32 and 34 respectively and serve to hold the rocker arm in one of two positions depending upon the position of the trip ring 20.

It should be noted that the rocker arm assembly is mounted so that there is no contact between either of the arms 32 and 34 and the trip ring 20 when the parts are in the relative positions indicated by Figure 1 or Figure 2.

With the apparatus thus described, the operation is as follows. Under normal speed conditions, the biasing of the helical spring 26 biases the trip ring 20 to the relative position with respect to the inner ring 16 shown in Figure 1. In this position, the ring portion 17 is concentric with the rotating shaft 10 and the ring portion 19 is eccentric therewith. The eccentricity of the portion 19 of the trip ring causes its periphery to move close to the rocker arm 34 once each revolution without touching it. The magnet 42 holds the rocker assembly 30 in the position shown so that the contact button 38 of the electric switch 39 is not depressed.

If, for any reason whatever, the speed of the rotating shaft 10 should exceed a predetermined value determined by the size of the weight 28 and the spring constant of the spring 26, the centrifugal force acting on the ring 20 causes the trip ring 20 to move against the biasing force of the helical spring 26 until the ring portion 19 becomes concentric with the shaft 10. As the portion 17 becomes eccentric, the periphery of the trip as it rotates will contact the arm 32 thus physically moving it very close to the holding magnetic 40 so that the force of magnetic attraction therebetween pulls them into holding engagement so that the rocker arm 32 is held free from the eccentric portion 17 of the trip ring 20 as shown in Figure 2. In assuming this position, the contact button 38 of the electric switch 39 is depressed by the extension 36 carried by the arm 32 thus providing the desired overspeed signal.

Once the speed of the shaft 10 is reduced to a normal operating speed, the spring 26 will force the trip ring 20 to return to its original position as indicated in Figure 1 and in doing so will cause the ring portion 19 to strike the arm 34 to return the rocker arm assembly 30 to the position indicated in Figure 1 where it is held by the holding magnet 42.

Thus it will be seen that an overspeed sensing arrangement is provided which provides for a minimum of contact between the parts upon overspeed and also has an automatic resetting feature.

While a particular embodiment of the invention has been illustrated and described, it will be obvious to those familiar with the art that various changes and modifications may be made without departing from the invention and it is intended to cover in the appended claims all such changes and modifications that come within the true spirit and scope of the invention.

What I claim as new and desire to secure by Letters Patent of the United States is:

1. A speed sensing device comprising a rotatable member, a trip ring member having first and second non-concentric annular portions, means for mounting said trip ring member for rotation with said rotatable member and permitting motion therebetween from a first position in which the center of said first annular portion coincides with the axis of rotation of said rotating member to a second position in which the center of said second annular portion coincides with said axis of rotation, means biasing said trip ring member towards said first position, a weight carried by said ring whereby centrifugal force acting thereon upon rotation thereof opposes the force of said biasing means, and control means actuated by contact with said first and second portions of said trip ring.

2. A speed sensing device comprising a rotatable member, a trip ring member having first and second non-concentric annular portions, means for mounting said trip ring member for rotation with said rotatable member and permitting motion therebetween from a first position in which the center of said first annular portion coincides with the axis of rotation of said rotating member to a second position in which the center of said second annular portion coincides with said axis of rotation, means biasing said trip ring member towards said first position, a weight carried by said ring whereby centrifugal force acting thereon upon rotation thereof opposes the force of said biasing means, and control means actuated by contact with said trip ring means comprising a pivoted rocker arm having a first portion contacted by said second portion of said ring upon said ring assuming said first position and a second portion contacted by said first portion of said ring upon assuming said second position.

3. Apparatus in accordance with claim 2 wherein means are provided to hold said rocker arm in a first position after initial contact between said second ring portion and said first portion of said rocker arm upon said trip ring member assuming said first position, and magnet means to hold said rocker arm in a second position after initial contact between said first ring portion and said second portion of said rocker arm upon said ring member assuming said second position.

4. A speed sensing device for a rotatable shaft comprising a first ring secured to said shaft for rotation therewith, a trip ring member having first and second non-concentric annular portions surrounding in spaced relationship said first ring member, mounting means comprising at least two support posts carried by one of said rings and passing through openings in the other of said rings, so as to permit radial movement between said rings, from a first position in which said first trip ring portion is concentric with said first ring to a second position in which said second trip ring portion is concentric with said first ring, biasing means including a spring between said first ring and said trip ring to bias said trip ring towards said first position, a weight attached to said trip ring member at a point to cause centrifugal force acting thereon upon rotation of said trip ring member to oppose the biasing force of said biasing means, first control means actuated by said second trip ring portion when said trip ring assumes said first position and second control means actuated by said first ring portion when said trip ring assumes said second position.

5. Apparatus in accordance with claim 4 wherein said first control means comprise a first arm of a pivotally mounted rocker arm assembly and said second control means comprise a second arm of said rocker arm assembly, magnet means to hold said first and second arms in a first position wherein said arms are out of contact with said first and second ring portions when said trip ring is in said first position but in which said second arm makes contact with said second ring portion when said trip ring is in said second position and to hold said first and second arms in a second position wherein they are out of contact with said first and second ring portions when said trip ring is in said second position and said first arm contacts said first ring portion when said trip ring is in said first position.

6. A centrifugal speed sensing device comprising a rotating member and a trip ring having first and second non-concentric annular portions arranged to rotate with said rotating member, means for normally positioning the center of said first annular portion on the axis of rotation of said rotatable member, means for repositioning said trip ring in response to the rotational speed of said rotating member so that the center of said second portion of said trip ring lies on the axis of rotation of said rotatable member, a pivotally mounted rocker arm adjacent said trip ring having a portion adjacent each of said portions of said trip ring for actuation therefrom, said rocker arm portions being on opposite sides of the rocker arm pivot point.

References Cited in the file of this patent
UNITED STATES PATENTS
1,076,472    Wilkinson _____ Oct. 21, 1913